United States Patent [19]

Brongers

[11] Patent Number: 6,036,807
[45] Date of Patent: Mar. 14, 2000

[54] METHOD FOR APPLYING A SECURITY CODE TO AN ARTICLE

[75] Inventor: Jan Douwe Brongers, Alphen aan den Rijn, Netherlands

[73] Assignee: ING Groep NV, Amsterdam, Netherlands

[21] Appl. No.: 09/043,827

[22] PCT Filed: Dec. 9, 1996

[86] PCT No.: PCT/NL96/00480

§ 371 Date: Aug. 7, 1998

§ 102(e) Date: Aug. 7, 1998

[87] PCT Pub. No.: WO97/21552

PCT Pub. Date: Jun. 19, 1997

[30] Foreign Application Priority Data

Dec. 12, 1995 [NL] Netherlands ............................ 1001876

[51] Int. Cl.$^7$ ...................................................... B32B 31/28
[52] U.S. Cl. ........................... 156/233; 156/253; 156/256; 156/272.8; 359/2; 283/86; 428/164; 428/915; 428/916
[58] Field of Search .................................... 156/233, 240, 156/252, 253, 256, 272.8; 283/86; 359/1, 2, 576; 428/687, 78, 141, 164, 209, 915, 916

[56] References Cited

U.S. PATENT DOCUMENTS

| 4,732,410 | 3/1988 | Holbein et al. ............................ 283/67 |
| 5,298,922 | 3/1994 | Merkle et al. . |
| 5,331,443 | 7/1994 | Stanisci . |
| 5,815,292 | 9/1998 | Walters ........................................ 359/2 |

FOREIGN PATENT DOCUMENTS

| 0372274 | 6/1990 | European Pat. Off. . |
| 2287430 | 9/1995 | United Kingdom . |

*Primary Examiner*—Michael W. Ball
*Assistant Examiner*—Michael A Tolin

[57] ABSTRACT

For applying a security code to an article, such as a cheque guarantee card, credit card, identity card or component of a motor or machine, use is made of a hologram or kinegram wherein personification or identification symbols, letters, numerals or figures are or will be cut out by burning-in using a laser beam, said hologram or kinegram being affixed to an underlying hologram or kinegram which is affixed to the article directly or via one or more holograms or kinegrams, the various features being such that the optical effect of an underlying hologram or kinegram is visible through the cut-out symbols.

10 Claims, 1 Drawing Sheet

METHOD FOR APPLYING A SECURITY CODE TO AN ARTICLE

The invention relates to a method for applying a security code to an article, such as a cheque guarantee card, credit card, identity card or component of a motor or machine, wherein a diffraction-generating microstructure, such as a hologram or kinegram, is applied to said article, in which diffraction-generating microstructure personification or identification symbols, such as letters, numerals or figures, are cut out by means of burning-in using a laser beam.

BACKGROUND OF THE INVENTION

A relevant example of a method for applying a security code to an article is used in the production of the so-called Europass. For this pass the diffraction-generating microstructure consists of a hologram and the cut-out symbols consist of four numerals, which extend through the entire depth of the hologram. As a result of the cut-out symbols, all that is seen at these locations is the substrate, that is to say the plastic card, which has been burned black. The possibility of the cut-out symbols being rendered invisible by filling up and of new, different personification or identification symbols being cut out is not excluded. Counterfeiting is thus possible.

The aim of the invention is, if not to preclude counterfeiting, certainly to make this appreciably more difficult.

SUMMARY OF THE INVENTION

According to the invention said microstructure is glued to another underlying diffraction-generating microstructure such as a hologram or kinegram, which is affixed to the article directly or via one or more other diffraction-generating microstructures, said symbols being cut out from the top diffraction-generating microstructure in such a size so that the optical effect of the underlying diffraction-generating microstructure becomes visible and/or detectable.

The essential feature for the result is that, in addition to the upper hologram, kinegram or optionally another "optical variable device", an optical effect of an underlying hologram or kinegram is also visible via the cut-out symbols. Of course, the principle of the invention is also applicable in the case of more than two holograms or kinegrams glued on top of one another. With this arrangement, via some cut-out symbols in the top diffraction-generating microstructure, the optical effect of the diffraction-generating microstructure located beneath it can be seen, whilst via cut-out symbols in the top diffraction-generating microstructure and the diffraction-generating microstructure located beneath it the optical effect of the underlying microstructure can be seen.

The said cut-out symbols can be burned in either after or before affixing the top diffraction-generating microstructure. If the cut-out symbols are applied after affixing the relevant diffraction-generating microstructure, burning-in must be carried out with the utmost care to prevent damage to the underlying hologram or kinegram.

The invention will now be explained with the aid of the two diagrammatic figures.

DESCRIPTION OF THE ILLUSTRATIVE EMBODIMENTS

Figure 1:
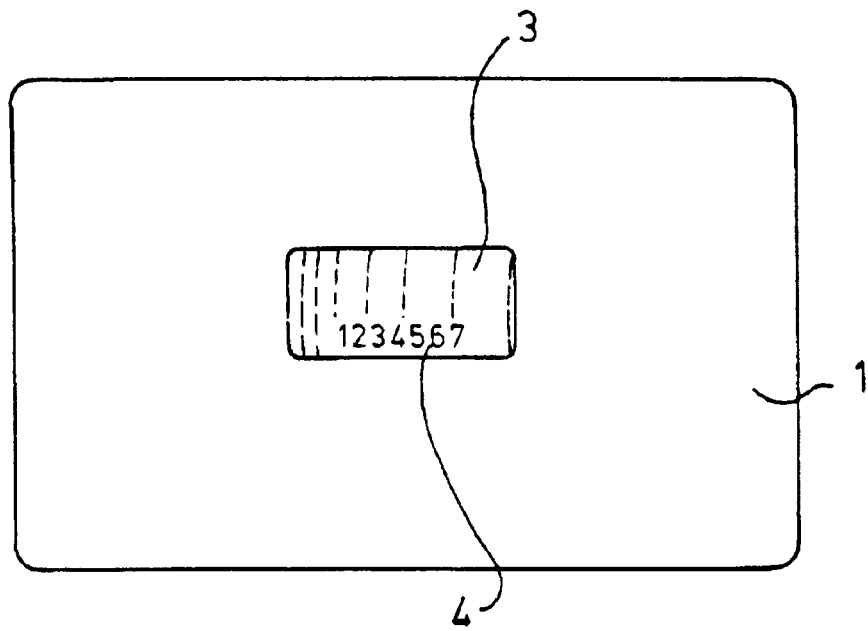
FIG. 1 shows a view of a plastic card with a security code applied thereon according to the invention.
Figure 2:
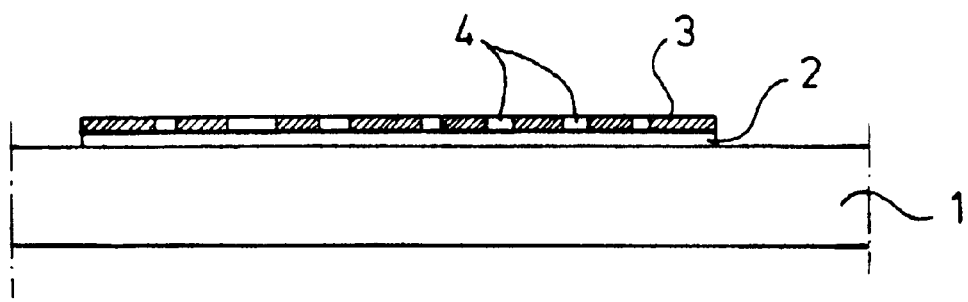
FIG. 2 shows a cross-section of the card according to FIG. 1 on a larger scale.

A first hologram or kinegram 2 has been glued on a plastic card 1, which serves as substrate, and a second hologram or kinegram 3 has been glued on to said first hologram or kinegram. In the upper, second hologram or kinegram 3, cut-out symbols 4 in the form of numerals have been made by means of a laser beam.

A person looking at the card sees the top hologram or kinegram 3 and, via the cut-out symbols 4, also sees the optical effect of the underlying hologram or kinegram 2.

The difference between a hologram and a kinegram is that a hologram suggests depth and a kinegram suggests movement. Both a hologram and a kinegram are formed by a diffraction-generating microstructure with a reflective coating consisting of a metal alloy.

It is exceptionally difficult, if not virtually impossible, to remove the top hologram or kinegram without damaging the bottom hologram or kinegram, or to fill in the cut-out symbols 4 in the top hologram or kinegram 3 and then to cut out symbols in approximately the same position without the optical effect of the bottom hologram or kinegram being damaged or substantially changed at the location of the cut-out symbols. Counterfeiting is therefore not easy to establish because an incomplete or damaged optical effect of the bottom hologram or kinegram becomes visible via the cut-out symbols in the top hologram or kinegram.

The top hologram or kinegram 3 can be glued to the bottom hologram or kinegram 2 before or after making the cut-out symbols 4.

More than two holograms or kinegrams glued to one another are also possible, in which case some cut-out symbols extend only through the top hologram or kinegram and other cut-out symbols extend through several holograms or kinegrams. Only the bottom hologram or kinegram remains unaffected.

The invention can be employed not only for cheque guarantee cards and credit cards but also for identity cards, machine components and the like. Within the scope of the invention, all sorts of variants are also conceivable in respect of the card referred to as an illustrative embodiment.

I claim:

1. A method for applying a security code to an article, wherein a diffraction-generating microstructure is applied to said article, in which diffraction-generating microstructure personification or identification symbols are cut out by means of burning-in using a laser beam, wherein the said microstructure defines a top microstructure that is glued to another underlying diffraction-generating microstructure which is affixed to the article directly or via one or more other diffraction-generating microstructures, said symbols being cut out from the top diffraction-generating microstructure in such a size so that the optical effect of the underlying diffraction-generating microstructure becomes visible and/or detectable.

2. A method according to claim 1 wherein the said symbols are made before the top diffraction-generating microstructure is affixed to the underlying diffraction-generating microstructure.

3. A method according to claim 1, wherein the said symbols are burned in by means of laser beams after affixing the top diffraction-generating microstructure, without the underlying diffraction-generating microstructure being damaged.

4. A method according to claim 1 wherein three or more diffraction-generating microstructures are affixed on top of one another and, through some cut-out symbols in the top diffraction-generating microstructure, the optical effect of the diffraction-generating microstructure located beneath it can be seen, and via cut-out symbols in the top diffraction-generating microstructure and the diffraction-generating microstructure located beneath it the optical effect of the underlying diffraction-generating microstructure can be seen.

5. A method according to claim 2 wherein three or more diffraction-generating microstructures are affixed on top of one another and, through some cut-out symbols in the top diffraction-generating microstructure, the optical effect of the diffraction-generating microstructure located beneath it can be seen, and via cut-out symbols in the top diffraction-generating microstructure and the diffraction-generating microstructure located beneath it the optical effect of the underlying diffraction-generating microstructure can be seen.

6. A method according to claim 3 wherein three or more diffraction-generating microstructures are affixed on top of one another and, through some cut-out symbols in the top diffraction-generating microstructure, the optical effect of the diffraction-generating microstructure located beneath it can be seen, and via cut-out symbols in the top diffraction-generating microstructure and the diffraction-generating microstructure located beneath it the optical effect of the underlying diffraction-generating microstructure can be seen.

7. An article to which a security code has been applied by a method comprising:

applying a diffraction generating microstructure to the article, in which diffraction-generating microstructure personification or identification symbols are cut out by means of burning-in using a laser beam, wherein the said diffraction-generating microstructure defines a top diffraction-generating microstructure, that is glued to an underlying diffraction-generating microstructure which is affixed to the article directly or via one or more other diffraction-generating microstructures, the symbols being cut out from the top diffraction generating microstructure in such a size so that the optical effect of the underlying diffraction-generating microstructure becomes visible and/or detectable.

8. An article according to claim 7 wherein the said symbols are made before the top diffraction-generating microstructure is affixed to the underlying diffraction-generating microstructure.

9. An article according to claim 7 wherein the said symbols are burned in by means of laser beams after affixing the top diffraction-generating microstructure, without the underlying diffraction-generating microstructure being damaged.

10. An article according to claim 7 wherein three or more diffraction-generating microstructures are affixed on top of one another and, through some cut-out symbols in the top diffraction-generating microstructure, the optical effect of the diffraction-generating microstructure located beneath it can be seen, and via cut-out symbols in the top diffraction-generating microstructure and the diffraction-generating microstructure located beneath it the optical effect of the underlying diffraction-generating microstructure can be seen.

* * * * *